(12) United States Patent
Yang (10) Patent No.: US 12,067,247 B2
(45) Date of Patent: Aug. 20, 2024

(54) METHOD OF MANAGING INDEPENDENT WORD LINE READ OPERATION IN FLASH MEMORY AND RELATED MEMORY CONTROLLER AND STORAGE DEVICE

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 41 days.

(21) Appl. No.: 18/078,077

(22) Filed: Dec. 8, 2022

(65) Prior Publication Data

US 2024/0192856 A1    Jun. 13, 2024

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2009/0113121 A1 | 4/2009 | Lee | |
| 2015/0039909 A1 | 2/2015 | Tseng | |
| 2019/0227749 A1* | 7/2019 | Wakchaure | G06F 3/0604 |
| 2019/0347041 A1* | 11/2019 | Shaharabany | G06F 3/061 |
| 2020/0026466 A1* | 1/2020 | Takano | G06F 3/061 |
| 2022/0083266 A1* | 3/2022 | Prakash | G06F 3/0679 |
| 2022/0171571 A1 | 6/2022 | Kang | |
| 2022/0415380 A1* | 12/2022 | Vittal Prabhu | G11C 11/4085 |
| 2023/0141986 A1* | 5/2023 | Nikuie | G06F 3/0659 |
| | | | 711/103 |

* cited by examiner

*Primary Examiner* — Edward J Dudek, Jr.
*Assistant Examiner* — Ralph A Verderamo, III
(74) *Attorney, Agent, or Firm* — Winston Hsu (57) ABSTRACT

A method of managing operation commands for a flash memory includes: providing a first command queue for receiving and storing a plurality of normal operation commands; providing at least one word line read (IWLR) command queue for receiving and storing a plurality of IWLR operation commands; issuing a lock state command between each two consecutive IWLR operation commands to the at least one second command queue; determining a selected command queue from the first command queue and the at least one IWLR command queues according to the lock state command; and delivering an operation command from the selected command queue to the flash memory.

21 Claims, 9 Drawing Sheets

METHOD OF MANAGING INDEPENDENT WORD LINE READ OPERATION IN FLASH MEMORY AND RELATED MEMORY CONTROLLER AND STORAGE DEVICE

BACKGROUND OF THE INVENTION

1. Field of the Invention

The present invention relates to flash memory, and more particularly, to a method of managing independent word line read operations, related memory controller and storage device.

2. Description of the Prior Art

Typically, flash memory supports multi-plane command sequence, which allows different planes of a flash memory die to be accessed simultaneously. However, such mode requires a flash memory controller to provide all addresses of planes that are desired to be accessed in a given period of time. In other words, it is not available to issue a memory operation command and addresses to a plane of the flash memory die, while another plane of the flash memory die is handling another memory operation command (i.e., in a busy state). Also, the multi-plane command sequence has a limitation in page addresses of different planes.

In order to improve flexibility and further improve degree of parallelism of flash memory access, an independent word line read (IWLR) access mode is proposed and supported by the flash memory. Such mode allows groups of planes of a flash memory die to be accessed independently. Compared to the conventional multi-plane access mode, the IWLR access mode allows one plane group (including several planes) of the flash memory die to accept and handle an IWLR operation command and addresses while another group of planes is handling another IWLR operation command (i.e., in a busy state), which significantly improve degree of parallelism of the flash memory access.

However, the IWLR operation commands cannot be executed by the flash memory dies concurrently with other types of memory operation commands, there is a need to provide a mechanism of managing the IWLR operation commands as well as other types of operation commands.

SUMMARY OF THE INVENTION

With this in mind, it is one object of the present invention to provide a mechanism of managing memory operation commands including normal operation commands and IWLR operation commands. Embodiments of the present invention rely a normal command queue for receiving and storing normal operation command (which may be directed to a read operation, a program operation or a erase operation on a flash memory die), and one or more IWLR command queues for receiving and storing IWLR operation commands. Additionally, embodiments of the present invention rely on lock state commands and unlock state commands to instruct an arbitration device when to deliver normal operation commands in the normal command queue and when to deliver IWLR operation commands in the IWLR command queue.

According to one embodiment of the present invention, a method of managing operation commands for a flash memory is provided. The method comprises: providing a first command queue for receiving and storing a plurality of normal operation commands; providing at least one word line read (IWLR) command queue for receiving and storing a plurality of IWLR operation commands; issuing a lock state command between each two consecutive IWLR operation commands to the at least one IWLR command queue; determining a selected command queue from the first command queue and the at least one IWLR command queues according to the lock state command; and delivering an operation command from the selected command queue to the flash memory.

According to one embodiment of the present invention, a memory controller for use in a flash memory to control operations of the flash memory is provided. The memory controller comprises: a storage unit, a queuing device, a processing unit and an arbitration device. The storage unit is configured to store information. The queuing device includes a first command queue and at least one independent word line read (IWLR) command queue, wherein the first command queue is utilized for storing a plurality of normal operation commands, and the at least one IWLR command queue is utilized for storing a plurality of IWLR operation commands. The processing unit is configured to execute program codes and information stored in the flash memory or in the storage unit so as to perform an operation of issuing a lock state command between each two consecutive IWLR operation commands to the at least one IWLR command queue. The arbitration device is configured to determine a selected command queue from the first command queue and the at least one IWLR command queues according to the lock state command, and deliver an operation command from the selected command queue to the flash memory.

According to one embodiment of the present invention, a storage device is provided. The storage device comprises: a flash memory; and a flash memory controller. The memory controller is configured to control the flash memory. The memory controller comprising: a storage unit, a queuing device, a processing unit and an arbitration device. The storage unit is configured to store information. The queuing device includes a first command queue and at least one independent word line read (IWLR) command queue, wherein the first command queue is utilized for storing a plurality of normal operation commands, and the at least one IWLR command queue is utilized for storing a plurality of IWLR operation commands. The processing unit is configured to execute program codes and information stored in the flash memory or in the storage unit so as to perform an operation of: issuing a lock state command between each two consecutive IWLR operation commands to the at least one IWLR command queue. The arbitration device is configured to determine a selected command queue from the first command queue and the at least one IWLR command queues according to the lock state command, and deliver an operation command from the selected command queue to the flash memory.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
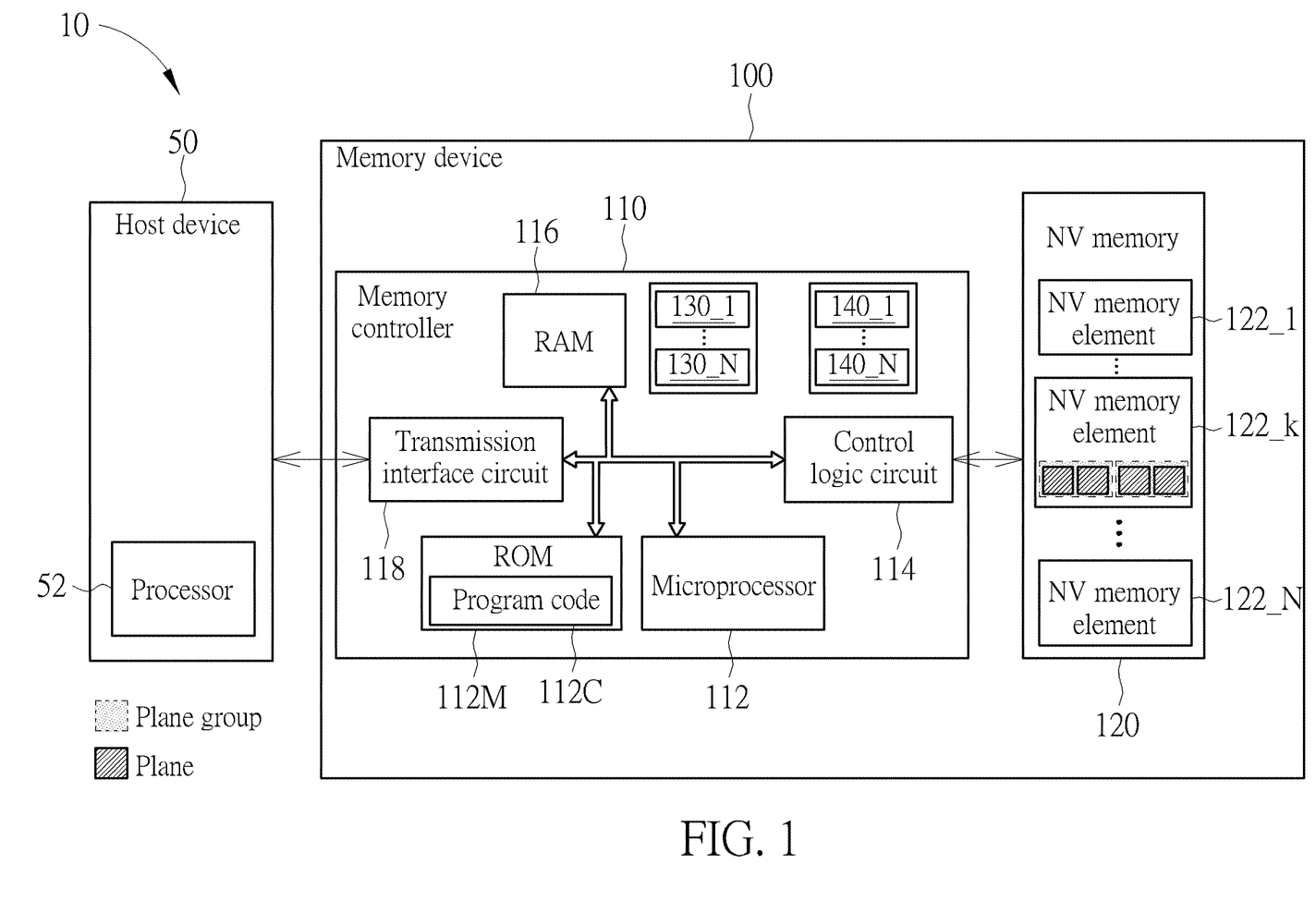
FIG. 1 illustrates a schematic diagram of a storage device including a memory controller according to one embodiment of the present invention.

FIG. 1 is a diagram illustrating an electronic device 10 according to an embodiment of the present invention, where the electronic device 10 comprises a host device 50 and a memory device 100. The host device 50 may comprise: at least one processor 52 configured to control operations of the host device 50. Examples of the host device 50 may include, but are not limited to: a smartphone, a tablet computer, a wearable device, a personal computer such as a desktop computer and a laptop computer, an imaging device such as a digital still camera or a video camera a game console, a car navigation system, a printer, a scanner or a server system. Examples of the memory device 100 may include, but are not limited to: a portable memory device (such as a memory card conforming to SD/MMC, CF, MS, XD or UFS specifications), a solid state drive (SSD) and various embedded storage device (such as an embedded storage device conforming to UFS or EMMC specifications).

According to various embodiments, the memory device 100 may comprise a controller such as a memory controller 110, and may further comprise a non-volatile (NV) memory 120. The NV memory 120 is configured to store information. The NV memory 120 may comprise at least one NV memory element (e.g. one or more NV memory elements), such as a plurality of NV memory elements 122_1-122_N. For example, the NV memory 120 may be a flash memory, and the NV memory elements 122_1-122_N may be a plurality of flash memory chips or a plurality of flash memory dies, respectively, but the present invention is not limited thereto. In addition, the NV memory 120 may comprise memory cells having a two-dimensional structure or may comprise memory cells having a three-dimensional structure.

As shown in FIG. 1, the memory controller 110 may comprise a processing circuit such as a microprocessor 112, a storage component such as a read-only memory (ROM) 112M, a control logic circuit 114, a garbage collection (GC) operation management engine 115, a volatile memory 116 and a transmission interface circuit 118, where at least one portion (e.g. a portion or all) of these components may be coupled to one another through a bus. The volatile memory 116 is implemented by a random access memory (RAM), for example, the volatile memory 116 may be a static RAM (SRAM). The volatile memory 116 may be configured to provide internal storage space to the memory controller 110, for example, temporarily storing information. In addition, the ROM 112M of this embodiment is configured to store a program code 112C, and the microprocessor 112 is configured to execute the program code 112C to control access of the NV memory 120. Alternatively, the program code 112C may be stored in the NV memory 120.

The memory controller 110 controls reading, writing and erasing of the NV memory 120 through a control logic circuit 114. In addition, the memory controller 110 could perform writing of user data based on host commands from the host device 50 and writing of valid data which is read from the NV memory 120 by the garbage collection and or wear-leveling concurrently. The control logic circuit 114 may be further configured to control the NV memory 120 and comprise an Error Correction Code (ECC) circuit (not shown), to perform data protection and/or error correction, but the present invention is not limited thereto. The transmission interface circuit 118 may conform to a specific communications specification (such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification) and may perform communications with the host 50 according to the specific communications specification.

Typically, the host device 50 may access the memory device 100, indirectly, through transmitting host commands and corresponding logic addresses to the memory controller 110. The memory controller 110 receives the host commands and the logic addresses, and translates the host commands to memory operation commands, and further controls the NV memory 120 with the memory operation commands to perform read, write or erase operations upon memory units or data pages having physical addresses within the NV memory 120, where the physical addresses corresponds to the logic addresses. When the memory controller 110 performs an erase operation on any NV memory element 122_k within the plurality of NV memory elements 122_1-122_N, at least one block of the NV memory element 122_k may be erased. In addition, each block of the NV memory element 122_k may comprise multiple pages, and an access operation (e.g. read or write) may be performed on one or more pages.

In one embodiment, each one of NV memory elements 122_1-122_N could be a NV memory die. There is control circuitry on each one of NV memory dies 122_1-122_N for executing memory operation commands issued by the memory controller 110. In addition, each of the NV memory dies 122_1-122_N could comprise a plurality of planes. Each plane may comprise a number of blocks of memory cells and associated row and column control circuitry. The memory cells in each plane may be arranged in a 2D or 3D memory structure. Planes of each of NV memory dies 122_1-122_N could be grouped into multiple plane groups. In a case where there are four planes on a NV memory die, each two planes may be grouped as a plane group. In other word, each of NV memory dies 122_1-122_N could comprise two plane groups.

On each of NV memory dies 122_1-122_N, there may be independent control circuitry for each plane group. Therefore, the plane groups are able to support an independent word line read (IWLR) mode. The multiple plane groups on a NV memory ide are able to accept and process IWLR operation commands in parallel without any timing restriction.

The memory controller 110 comprises a plurality of queuing devices 130_1-130_N, each of the queuing devices 130_1-130_N correspond to one of NV memory dies 122_1-122_N, and configured to receive and store memory operation commands of a corresponding NV memory die. The memory controller 110 comprises a plurality of arbitration devices 140_1-140_N, each of the arbitration devices 140_1-140_N correspond to one of queuing devices 130_1-130_N, and configured to perform arbitration on a corresponding queuing device.

According to various embodiments of the present invention, the memory controller 110 could generate memory operation commands including normal operation commands and independent word line read (IWLR) operation commands for accessing the NV memory 120 in response to the host commands. The normal commands are intended to perform program, read and erase operations with respect to specific one of the NV memory dies 122_1-122_N. On the other hand, the IWLR operation commands are intended to perform read operations with respect to specific plane groups of the NV memory dies 122_1-122_N. When the memory controller 110 relies upon the IWLR operation commands to access the NV memory 120, the normal operation commands are not allowed to be applied to the NV memory dies 122_1-122_N. In other words, the NV memory dies 122_1-122_N 120 may enter either a normal access mode or an IWLR access mode, respectively. Therefore, it is necessary to utilize command queues for delaying and buffering the normal operation commands and the IWLR operation commands.

Figure 2A:
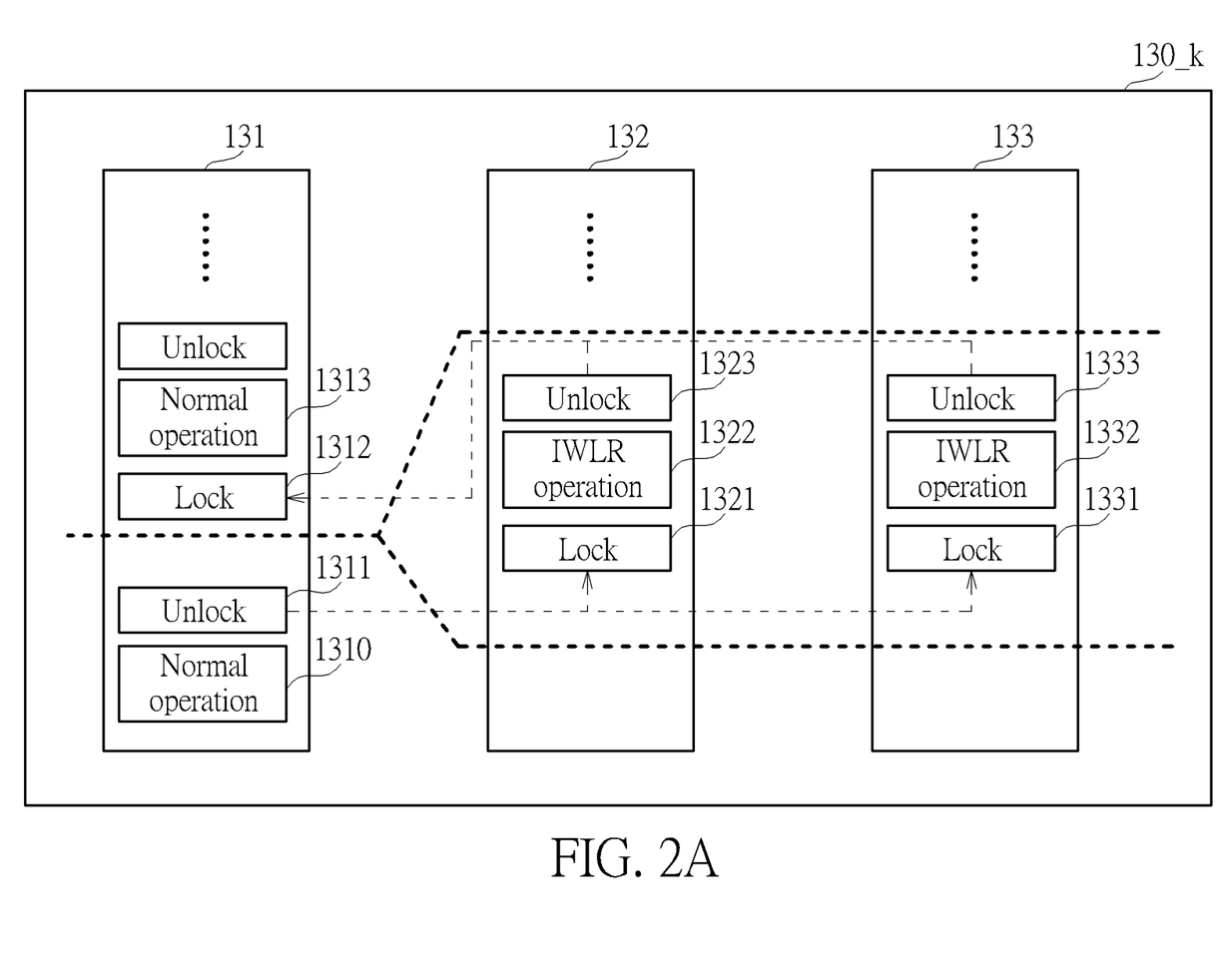
FIG. 2A illustrates how to manage normal operation commands and IWLR operation commands with lock state commands according to a first embodiment of the present invention.

Please refer to FIG. 2A, which illustrates how to manage the normal operations commands and the IWLR operation commands according to a first embodiment of the present invention. In the first embodiment, a queuing device 130_k (remaining of the queuing device 130_1-130_N will be the same) comprises a normal command queue 131, IWLR command queues 132 and 133. The normal command queue 131 is configured to receive and store normal operation commands on a first-in first out (FIFO) basis (i.e., the oldest (first) entry in the queue is processed first). The normal operation commands may be directed to memory operations, such as read, program and erase with respect to a NV memory die 122_k. The IWLR command queue 132 is configured to store IWLR operation commands that are intended for performing read operations on a first plane group of the NV memory die 122_k, while the IWLR command queue 133 is configured to store IWLR operation commands that are intended for performing read operations on a second plane group of the NV memory die 122_k. Both of the IWLR command queues 132 and 133 are operated on a FIFO basis. Please note that, there may be more plane groups included on the NV memory die 122_k according to various embodiments of the present invention. Thus, a number of the IWLR command queues included in the queuing device 130_k may be different in various embodiments of the present invention. In one embodiment, if there are four plane groups included on the NV memory die 122_k, there will be four IWLR command queues in the queuing device 130_k.

In the normal command queue 131, a lock state command will be placed prior to each normal operation command, and each normal operation command will be followed by an unlock state command. In the IWLR command queues 132 and 133, a lock state command will be placed prior to each IWLR operation command, and each IWLR operation command will be followed by a unlock state command.

The arbitration device 140_k is configured to select between the normal command queue 131 and the IWLR command queues 132 and 133 for delivering either the normal operation commands or the IWLR operation commands to the NV memory die 122_k. Typically, when the NV memory die 122_k or a target plane group of the NV memory die 122_k is in an idle state, the arbitration device 140_k is configured to deliver operation commands (i.e., normal or IWLR operation commands) in the command queue if the oldest entry in the queue is an operation command rather than lock state or unlock state commands. However, if the oldest entry in the queue is a lock state command or an unlock state command, things will be different.

The lock state command is configured to notify the arbitration device 140_k to suspend delivering operation commands pending in the command queues. For example, when the arbitration device 140 finds that the lock state command 1321 is the oldest entry pending in the IWLR command queue 132, the delivery of the IWLR operation commands in the IWLR command queue 132 will be suspended by the arbitration device 140_k. Accordingly, the arbitration device 140_k is configured to check the oldest entries in the normal command queue 131 and the IWLR command queue 133. When the arbitration device 140_k finds that the lock state command 1331 is the oldest entry pending in the IWLR command queue 133, the delivery of the IWLR operation commands in IWLR command queue 133 will be suspended by the arbitration device 140 as well.

That is to say, the lock state command causes the command queue to enter a lock state. The lock state of the IWLR command queues 132 and 133 requires an unlock state command in the normal command queue 131 to unlock. For example, after the normal operation command 1310 is delivered to the NV memory die 122_k, an unlock state command 1311 will be the oldest entry pending in the normal command queue 131. Once the arbitration device 140 finds that the unlock state command 1311 is the oldest entry pending in the normal command queue 131, the lock state commands 1321 and the lock state commands 1331 will be removed by the arbitration device 140 (The unlock state command 1311 in the normal command queue 131 will be removed as well). Accordingly, the lock state of the IWLR command queues 132 and 133 will be unlocked. The IWLR operation command 1322 will be delivered to the first plane group of the NV memory die 122_k, (when the first plane group of the NV memory die 122_k is not in a busy state) while the IWLR operation command 1332 will be delivered to the second plane group of the NV memory die 122_k (when the second plane group of the NV memory die 122_k is not in a busy state). In the meantime, as the oldest entry pending in the normal command queue 131 is a lock state command 1312, the normal command queue 131 is placed in the lock state.

After the IWLR operation command 1322 and the IWLR operation command 1332 are respectively delivered to the first plane group and the second plane group of the NV memory die 122_k, an unlock state command 1323 pending in the IWLR command queue 132 will be the oldest entry in the queue, as well as an unlock state command 1333 pending in the IWLR command queue 133 will be the oldest entry in the queue, which allows the lock state of the normal command queue to be unlocked. That is, once the arbitration device 140 finds that all the oldest entries pending in the IWLR command queues 132 and 133 are unlock state commands, the arbitration device 140 will remove the lock state command 1312 pending in the normal command 131 (as well as remove the unlock state commands 1323 and 1333 from IWLR command queues 132 and 133) and start to deliver the normal operation command 1313.

Figure 2B:
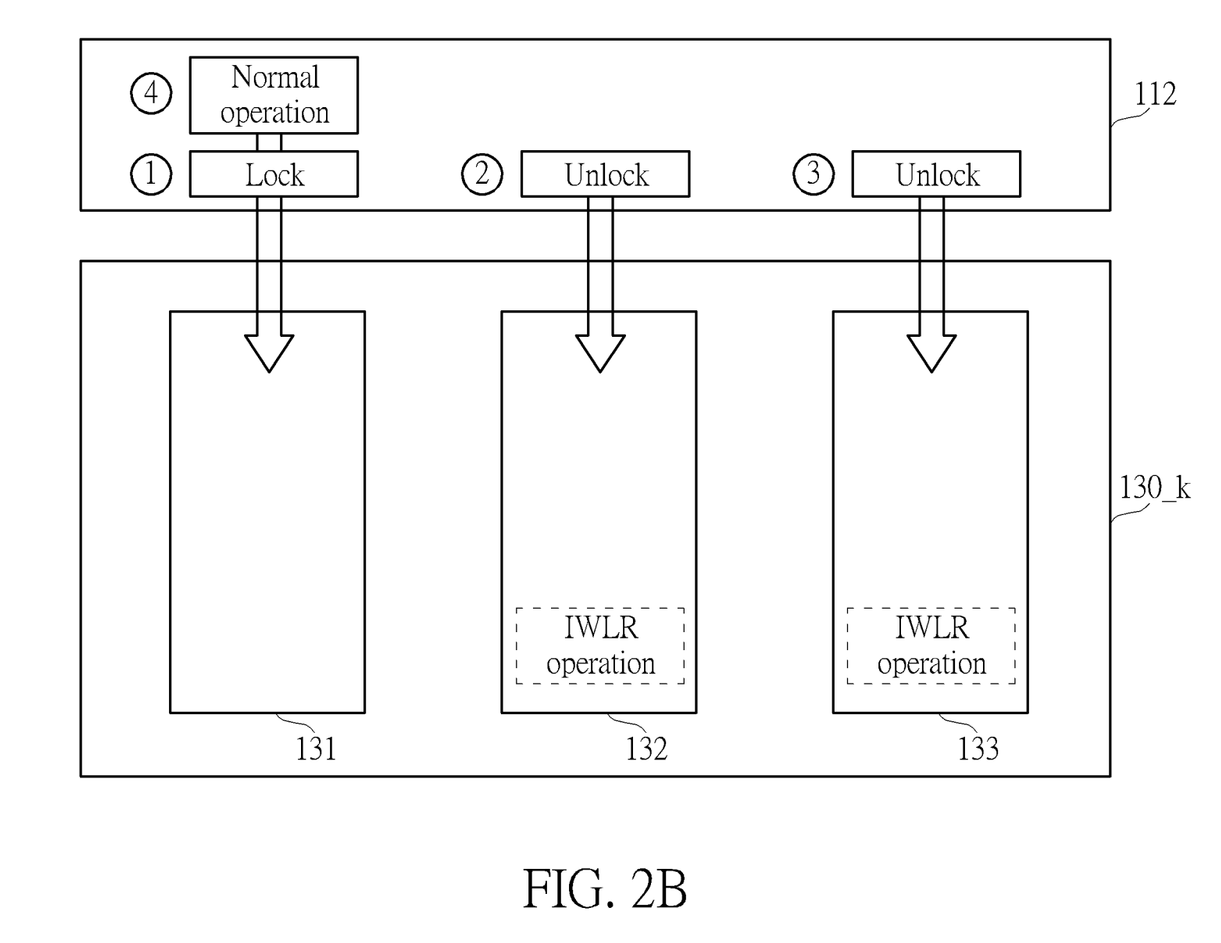
FIG. 2B illustrates an order in which a memory controller issues command when switching to a normal access mode in the first embodiment.
Figure 2C:
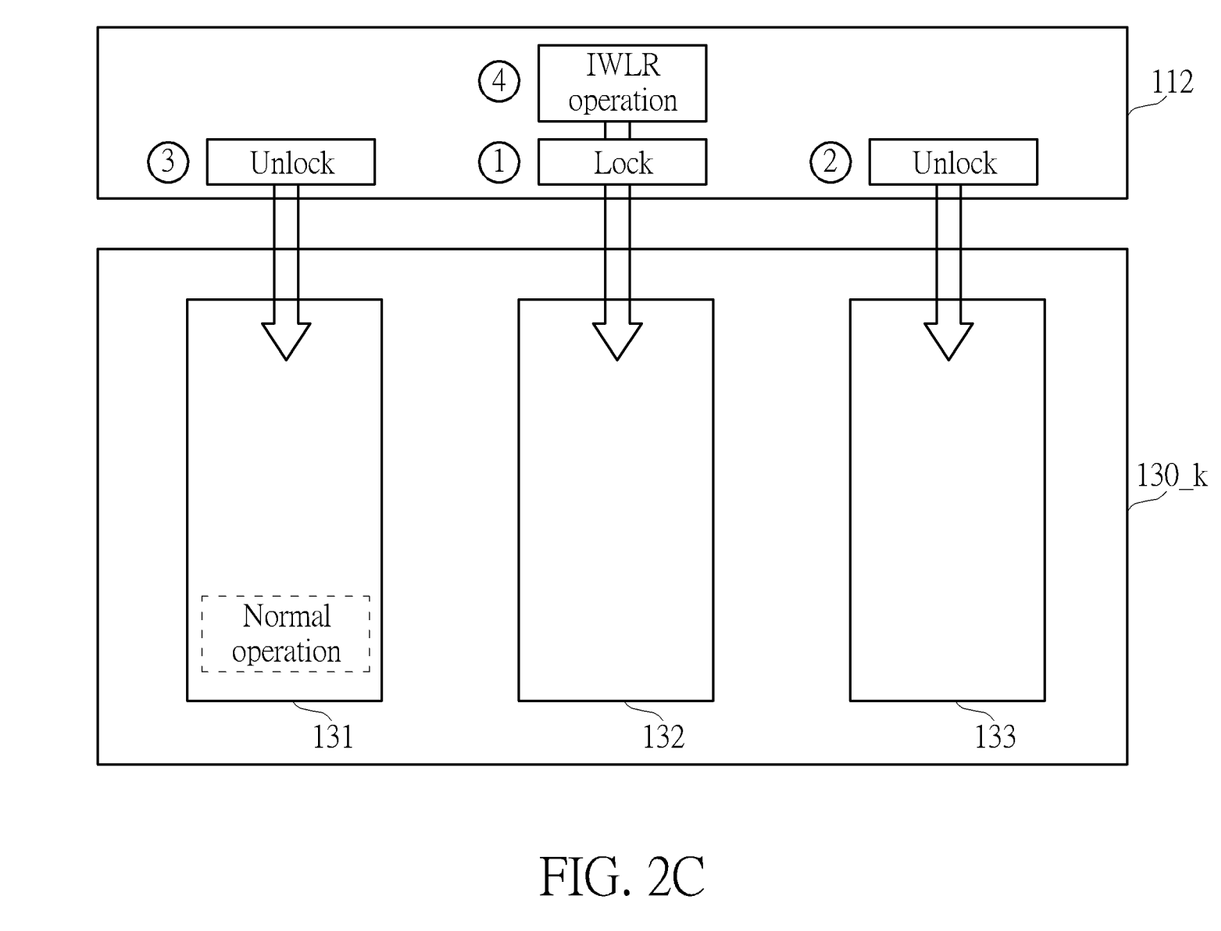
FIG. 2C illustrates an order in which a memory controller issues command when switching to an IWLR normal access mode in the first embodiment.

FIG. 2B and FIG. 2C illustrate orders in which the memory controller 110 issues operation commands in the embodiment FIG. 2A. Please refer to FIG. 2B, which illustrates an order in which the memory controller 110 issues a normal operation command if a previous operation command that is issued by the memory controller 110 is an IWLR operation command (which may have been delivered or still pending in the queue). That is, the NV memory die 122_k is about to be switched from the IWLR access mode to the normal access mode. In such condition, the memory controller 110 will firstly issue a lock state command to the normal command queue 131. Second, the memory controller 110 issues an unlock state command to the IWLR command queue 132. Third, the memory controller 110 issues an unlock state command to the IWLR command queue 133. Finally, the memory controller 110 issues the normal operation command to the normal command queue 131. Please refer to FIG. 2C, which illustrates an order in which the memory controller 110 issues an IWLR operation command if a previous operation command that is issued by the memory controller 110 is a normal operation command (which may have been delivered or still pending in the queue). That is, the NV memory die 122_k is about to be switched from the normal access mode to the IWLR access mode. First, the memory controller 110 issues a lock state command to the IWLR command queue 132. Second, the memory controller 110 issues a lock state command to the IWLR command queue 133. Third, the memory controller 110 issues an unlock state command to the normal command queue 131. Finally, the memory controller 110 issues the IWLR operation command to the IWLR command queue 132.

Figure 3A:
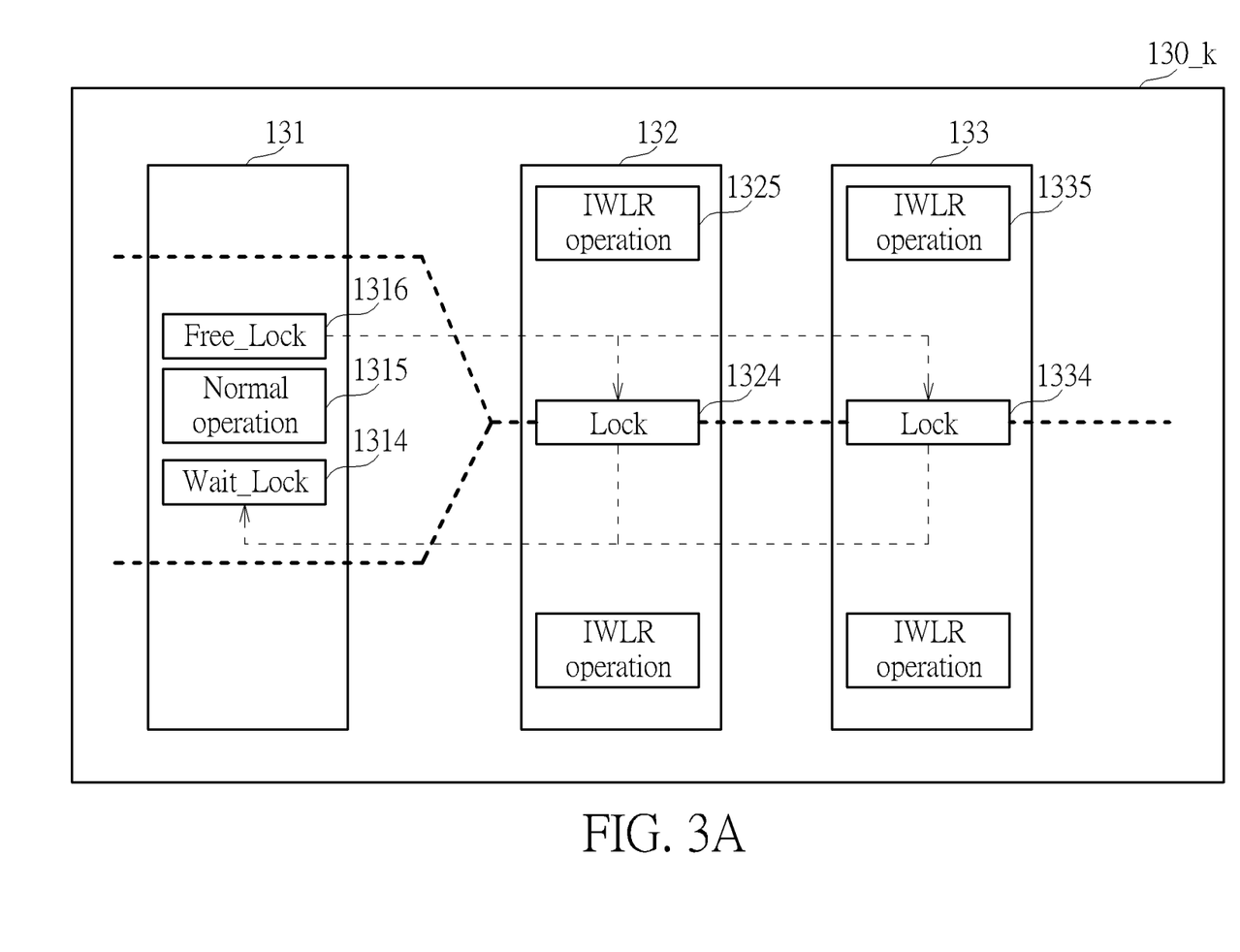
FIG. 3A illustrates how to manage normal operation commands and IWLR operation commands with lock state commands according to a second embodiment of the present invention.

Please refer to FIG. 3A, which illustrates how to manage normal operation commands and IWLR commands according to a second embodiment of the present invention. In the second embodiment, the queuing device 130_k (remaining of the queuing device 130_1-130_M will be the same) comprises the normal command queue 131 and the IWLR command queues 132 and 133 (which are all operated on a FIFO basis). In the normal command queue 131, a wait_lock state command will be placed prior to each normal operation command, and each normal operation command will be followed by a free_lock state command. In the IWLR command queues 132 and 133, a lock state command will be placed between two consecutive IWLR operation commands. In addition, The IWLR command queue 132 is configured to store IWLR operation commands that are intended for performing read operations on the first plane group of the NV memory die 122_k, while the IWLR command queue 133 is configured to store IWLR operation commands that are intended for performing read operations on a second plane group of the NV memory die 122_k. Please note that, there may be more plane groups included on the NV memory die 122_k according to various embodiments of the present invention. Thus, a number of the IWLR command queues included in the queuing device 130_k may be different in various embodiments of the present invention. In one embodiment, if there are four plane groups included on the NV memory die 122_k, there will be four IWLR command queues in the queuing device 130_k.

In the second embodiment, the lock state command are configured to notify the arbitration device 140 to suspend delivering operation commands pending in the IWLR command queues 132 and 133. For example, when the arbitration device 140 finds that the lock state command 1324 is the oldest entry pending in the IWLR command queue 132, the delivery of the IWLR operation commands in IWLR command queue 132 will be suspended by the arbitration device 140. Accordingly, the arbitration device 140_k is configured to check the oldest entries in the normal command queue 131 and the IWLR command queue 133. As the arbitration device 140_k finds that the lock state command 1334 is the oldest entry pending in the IWLR command queue 133, the delivery of the IWLR operation commands in IWLR command queue 133 will be suspended by the arbitration device 140 as well.

The lock state command 1324 and 1334 causes the IWLR command queues 132 and 133 to enter the lock state. The lock state of the IWLR command queues 132 and 133 requires a free_lock state command in the normal command queue 131 to unlock. On the other hand, the lock state command 1324 and 1334 is able to unlock the lock state of the normal queue 131. That is, the wait_lock state command 1314, which cause the arbitration device 140_k to suspend the delivery of normal operation commands in the normal command queue 131, will be removed as the arbitration device 140 finds that all the oldest entries in the IWLR command queues 132 and 133 are lock state commands. Accordingly, the arbitration device 140 is configured to deliver the normal operation command 1315 to the NV memory die 122_k (when the NV memory die 122_k is not in a busy state). After that, a free_lock state command 1316 will be the oldest entry pending in the normal command queue 131. Once the arbitration device 140_k fins that the free_lock state command 1316 pending in the normal command queue 131 is the oldest entry, the lock state commands 1324 and the lock state commands 1334 (as well as the free_lock state command 1316) will be removed from the command queues by the arbitration device 140_k. Accordingly, the lock state of the IWLR command queues 132 and 133 will be unlocked. The IWLR operation command 1325 will be delivered to the first plane group of the NV memory die 122_k (when the first plane group of the NV memory die 122_k is not in a busy state), while the IWLR operation command 1335 will be delivered to the second plane group of the NV memory die 122_k (when the second plane group of the NV memory die 122_k is not in a busy state).

Figure 3B:
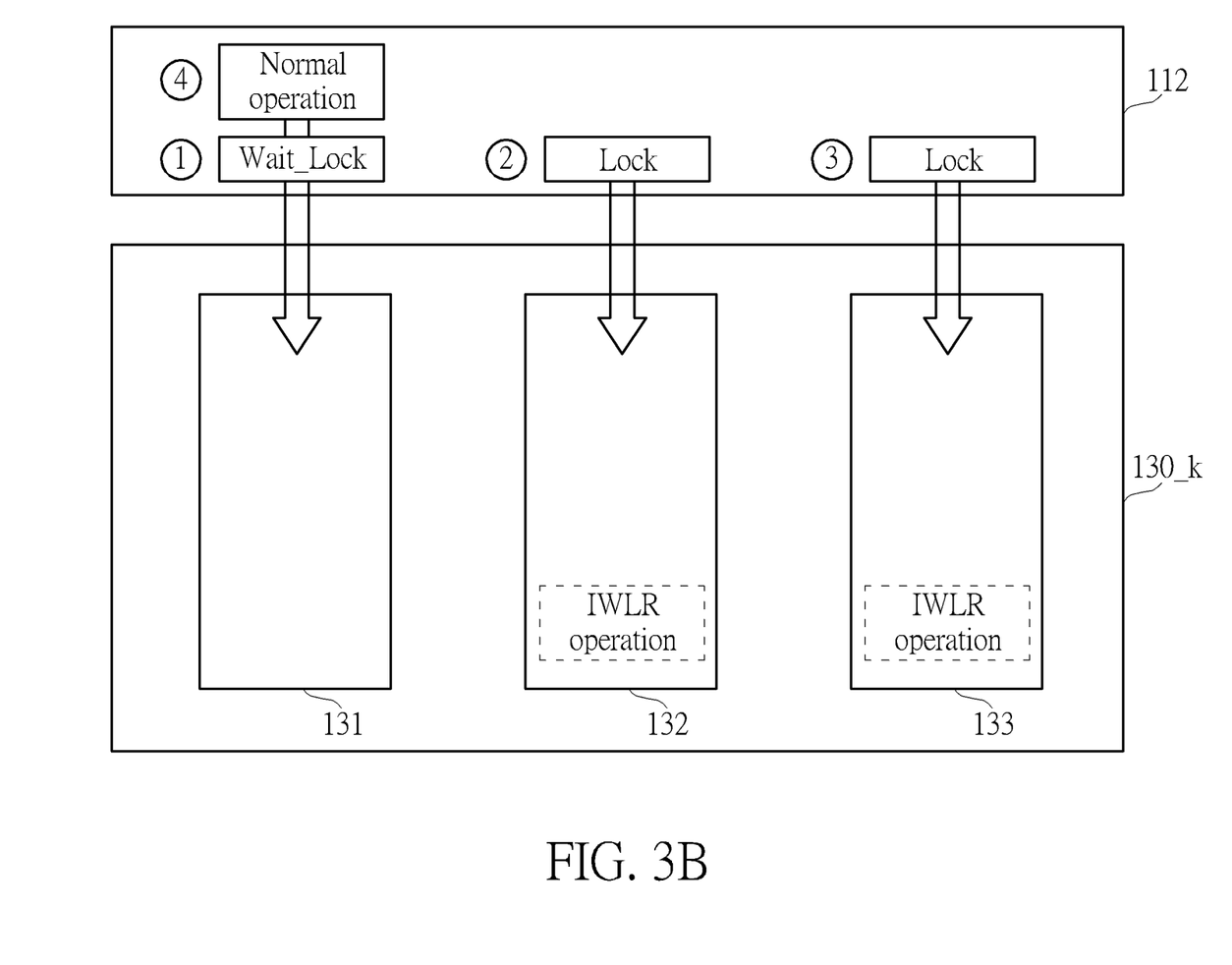
FIG. 3B illustrates an order in which a memory controller issues command when switching to a normal access mode in the second embodiment.
Figure 3C:
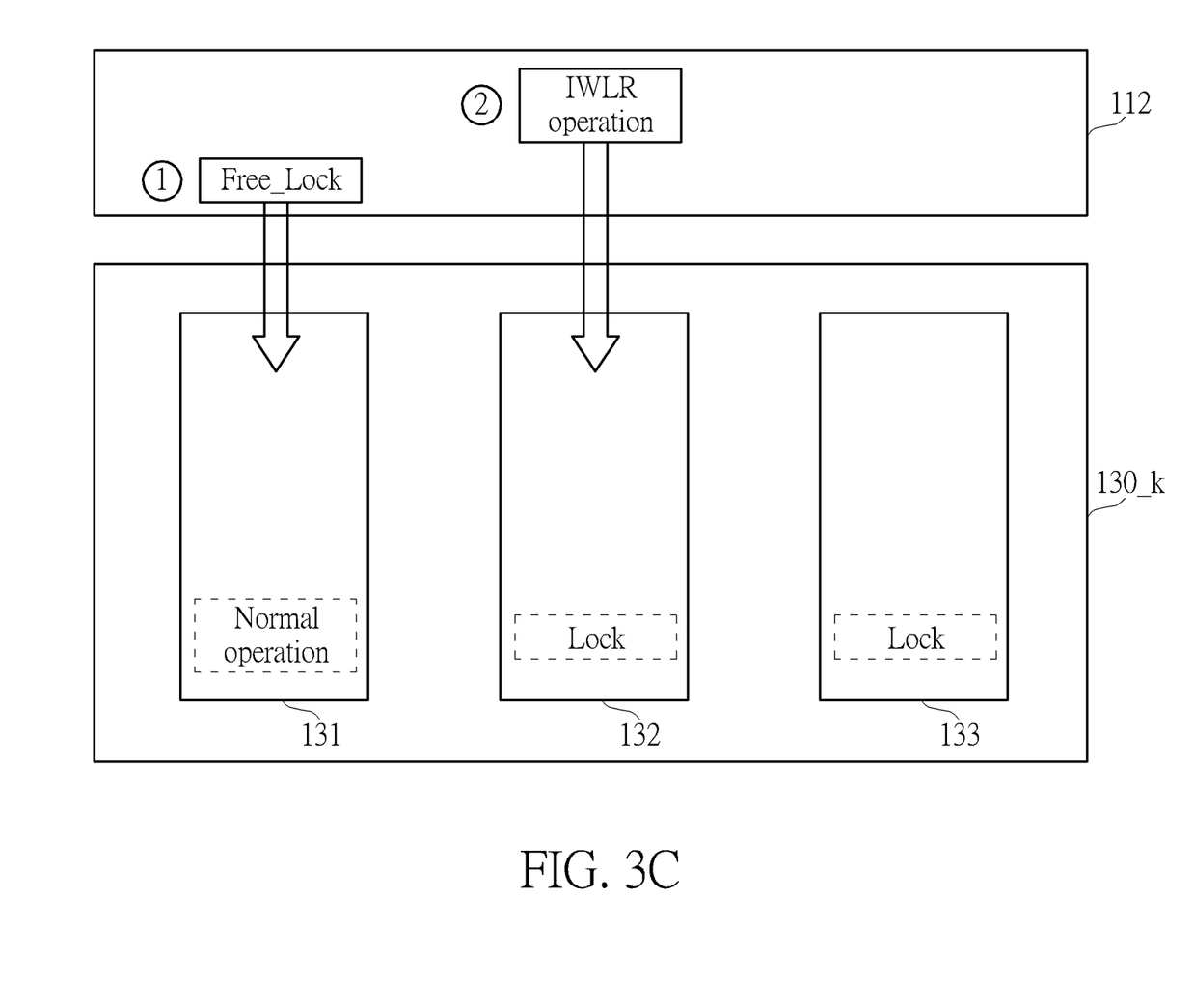
FIG. 3C illustrates an order in which a memory controller issues command when switching to an IWLR normal access mode in the second embodiment.

FIG. 3B and FIG. 3C illustrate orders in which the memory controller 110 issues operation commands in the embodiment FIG. 3A. Please refer to FIG. 3B, which illustrates an order in which the memory controller 110 issues a normal operation command if a previous operation command that is issued by the memory controller 110 is an IWLR operation command (which may have been delivered or not). That is, the NV memory die 122_k is about to be switched from the IWLR access mode to the normal access mode. First, the memory controller 110 issues a wait_lock state command to the normal command queue 131. Second, the memory controller 110 issues a lock state command to the IWLR command queue 132. Third, the memory controller 110 issues a lock state command to the IWLR command queue 133. Finally, the memory controller 110 issues the normal operation command to the normal command queue 131. Please refer to FIG. 3C, which illustrates an order in which the memory controller 110 issues an IWLR operation command if a previous operation command is a normal operation command (which may have been delivered or not). That is, the NV memory die 122_k is about to be switched from the normal access mode to the IWLR access mode. First, the memory controller 110 issues a free_lock state command to the normal command queue 131. Finally, the memory controller 110 issues the IWLR operation command to the IWLR command queue 132. Compared to the orders illustrated by FIG. 2B and FIG. 2C, the memory controller 110 issues fewer commands to allow the NV memory die 122_k to be switched from the normal access mode to the IWLR access mode.

Figure 4:
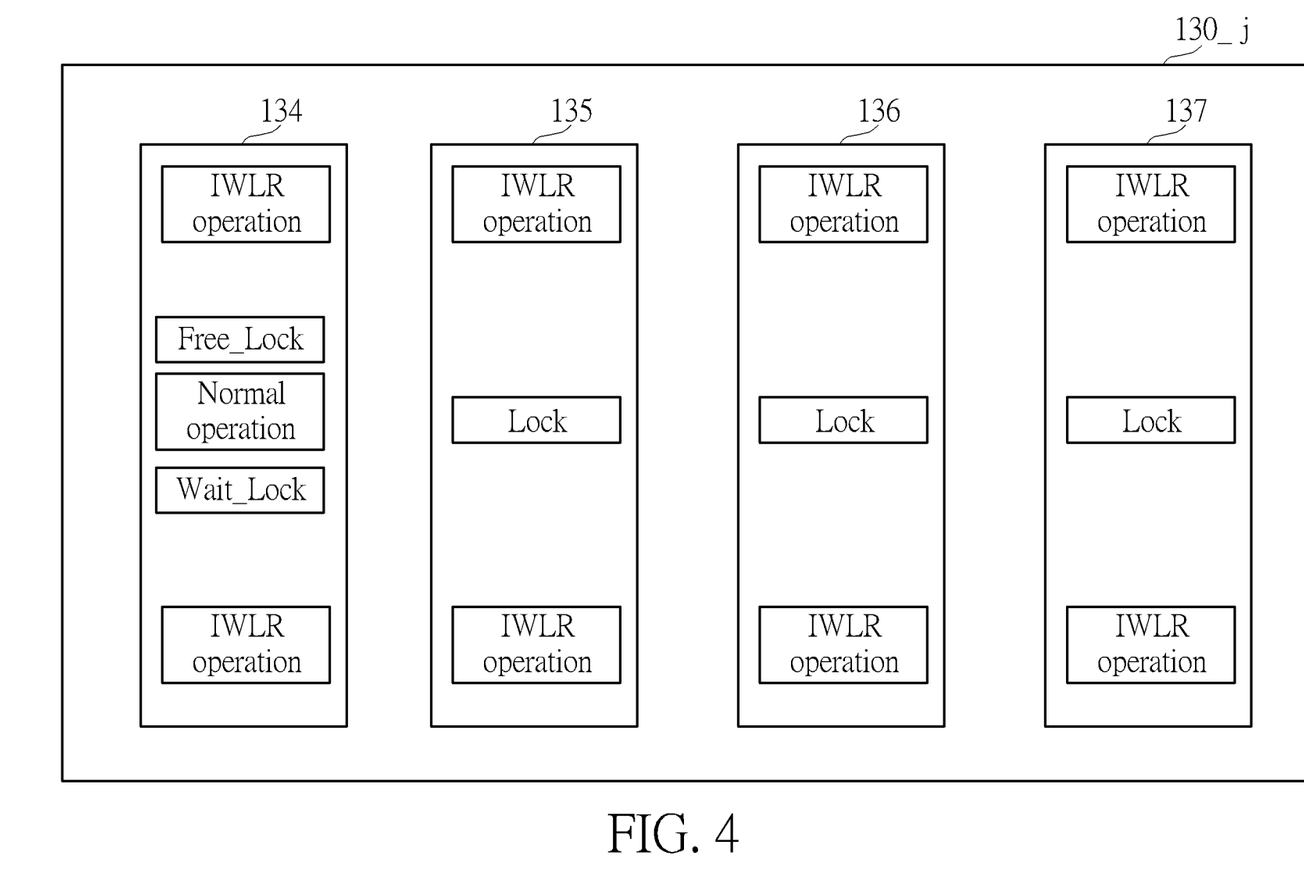
FIG. 4 illustrates how to manage normal operation commands and IWLR operation commands with lock state commands according to a third embodiment of the present invention.

Please refer to FIG. 4, which illustrates how to manage normal operation commands and IWLR operation commands according to a third embodiment of the present invention. In the third embodiment, the queuing device 130_k (remaining of the queuing device 130_1-130_M will be the same) comprises a shared command queue 134 and IWLR command queues 135-137. The shared command queue 134 could receive and store IWLR operation commands directed to a first plane group of a NV memory die 122_j and normal operation commands directed to the NV memory die 122_j. Additionally, the IWLR command queues 135-137 could receive and store IWLR operation commands directed to a second plane group, a third plane group and a fourth plane group of the NV memory die 122_j, respectively. In the shared command queue 134, a wait_lock state command will be placed prior to each normal operation command, while each normal operation command is followed by a free_lock state command. Furthermore, two consecutive IWLR operation commands could be separated between a combination of the wait_lock state command, the normal operation command and the free_lock command. In the IWLR command queues 135-137, a lock state command will be placed between two consecutive IWLR operation commands. Please note that, the shared command queue could be used in conjunction with the lock and unlock state commands of the first embodiment. For example, each normal command or each IWLR command in the shared command queue may be surrounded by a lock state command and an unlock state command.

Figure 5:
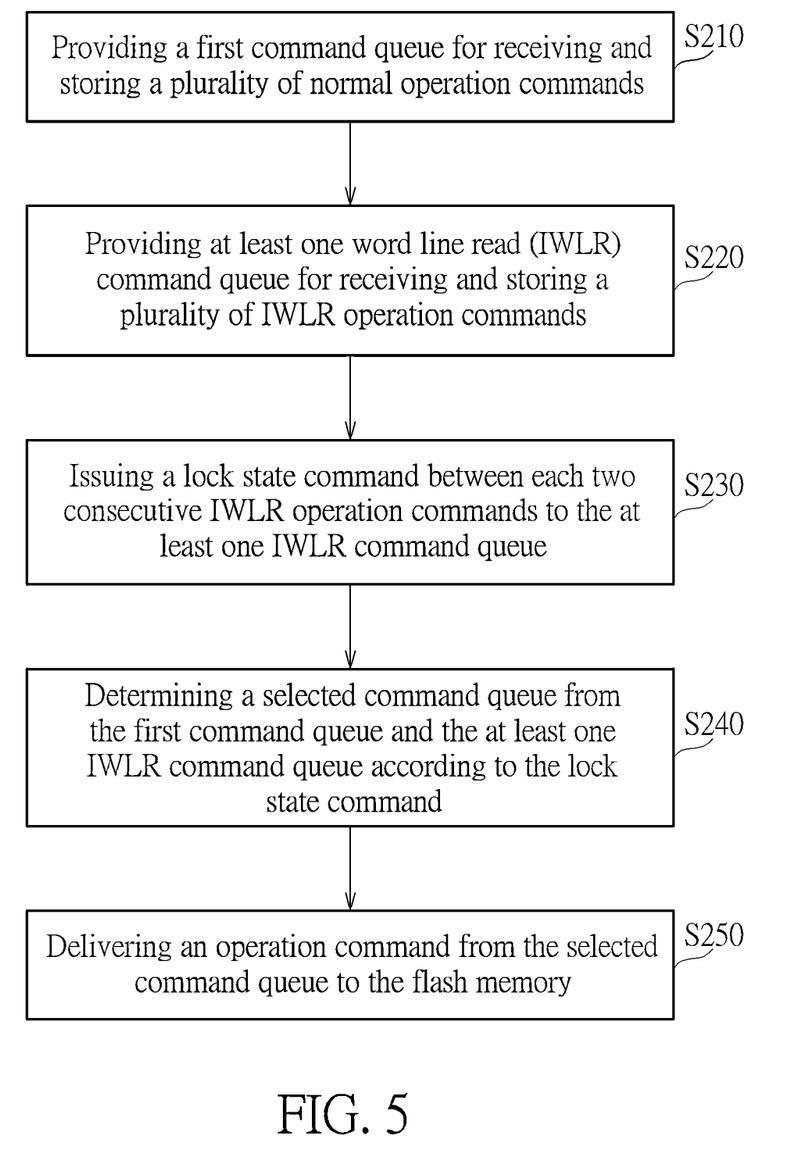
FIG. 5 illustrates a method of managing operation commands for a flash memory according to one embodiment of the present invention.

FIG. 5 illustrates a method of managing operation commands for a flash memory. As shown in the figure, the method of the present invention includes the following simplified flow:

Step S210: providing a first command queue for receiving and storing a plurality of normal operation commands;

Step S220: providing at least one word line read (IWLR) command queue for receiving and storing a plurality of IWLR operation commands;

Step S230: issuing a lock state command between each two consecutive IWLR operation commands to the at least one IWLR command queue;

Step S240: determining a selected command queue from the first command queue and the at least one IWLR command queues according to the lock state command; and Step S250: delivering an operation command from the selected command queue to the flash memory.

Since principles and specific details of the foregoing steps have been explained in detail through the above embodiments, further descriptions will not be repeated here. It should be noted that the above flow may be possible, by adding other extra steps or making appropriate modifications and adjustments, to better improve flexibility and further improve degree of parallelism of flash memory access. Furthermore, all the operations set forth in the above embodiments can be implemented by the memory controller 110 shown in FIG. 1.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function (s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing operation commands for a flash memory, comprising:
providing a first command queue for receiving and storing a plurality of normal operation commands;
providing at least one word line read (IWLR) command queue for receiving and storing a plurality of IWLR operation commands;
issuing a lock state command between each two consecutive IWLR operation commands to the at least one IWLR command queue;
determining a selected command queue from the first command queue and the at least one IWLR command queue according to the lock state command; and
delivering an operation command from the selected command queue to the flash memory.

2. The method of claim 1, wherein the step of determining the selected command queue according to the lock state command comprises:
when the lock state command is an oldest entry pending in the at least one IWLR command queue, determining the first command queue as the selected command queue.

3. The method of claim 2, further comprising:
issuing a lock state command prior to a normal operation command to the first command queue; and
issuing an unlock state command following the normal operation command to the first command queue.

4. The method of claim 3, wherein the step of determining the selected command queue according to the lock state command comprises:
when the lock state command is an oldest entry pending in the first command queue, determining the at least one IWLR command queue as the selected command queue; and
when the unlock state command is an oldest entry pending in the first command queue, removing the unlock state command from the first command queue, removing the lock state command from the at least one IWLR command queue and determining the at least one IWLR command queue as the selected command queue.

5. The method of claim 2, further comprising:
issuing the lock state command prior to an IWLR operation command to the at least one command queue; and
issuing an unlock state command following the IWLR operation command to the at least one command queue.

6. The method of claim 5, wherein the step of determining the selected command queue according to the lock state command comprises:
when the lock state command is an oldest entry pending in the at least one IWLR command queue, determining the first command queue as the selected command queue; and
when the unlock state command is an oldest entry pending in the at least one IWLR command queue, removing the unlock state command from the at least one IWLR command queue, removing the lock state command from the first command queue and determining the first command queue as the selected command queue.

7. The method of claim 2, further comprising:
issuing a wait lock state command prior to a normal operation command to the first command queue; and
issuing a free lock state command following the normal operation command to the first command queue.

8. The method of claim 7, wherein the step of determining the selected command queue according to the lock state command comprises:
when the lock state command is an oldest entry pending in the at least one IWLR command queue, removing the wait lock state command from the first command queue and determining the first command queue as the selected command queue;
when the wait lock state command is an oldest entry pending in the first command queue, determining the at least one IWLR command queue as the selected command queue; and
when the free block state command is an oldest entry pending in the first command queue, removing the lock state command from the at least one IWLR command queue, removing the free lock state command from the first command queue and determining the at least one IWLR command queue as the selected command queue.

9. The method of claim 7, further comprising:
issuing at least one IWLR operation command to the first command queue; and
issuing the wait lock state command following the at least one IWLR operation command to the first command queue or issuing the free lock state command prior to the at least one IWLR operation command to the first command queue.

10. The method of claim 1, wherein the flash memory comprises a plurality of flash memory dies, wherein each of the flash memory dies comprises a plurality of plane groups, each of the plane groups comprises a plurality of planes, and each of the IWLR operation command is utilized to perform a read operation on a specific one of the plane groups.

11. A memory controller for use in a flash memory to control operations of the flash memory, comprising:
a storage unit, configured to store information;
a queuing device including a first command queue and at least one independent word line read (IWLR) command queue, wherein the first command queue is utilized for storing a plurality of normal operation commands, and the at least one IWLR command queue is utilized for storing a plurality of IWLR operation commands;
a processing unit, configured to execute program codes and information stored in the flash memory or in the storage unit so as to perform an operation of:
issuing a lock state command between each two consecutive IWLR operation commands to the at least one IWLR command queue; and
an arbitration device, configured to determine a selected command queue from the first command queue and the at least one IWLR command queue according to the lock state command, and deliver an operation command from the selected command queue to the flash memory.

12. The memory controller of claim 11, wherein the arbitration device is further configured to determine the first command queue as the selected command queue when the lock state command is an oldest entry pending in the at least one IWLR command queue.

13. The memory controller of claim 12, wherein the processing unit is further configured to perform operations of:
issuing a lock state command prior to a normal operation command to the first command queue; and
issuing an unlock state command following the normal operation command to the first command queue.

14. The memory controller of claim 13, wherein the arbitration device is further configured to:
determine the at least one IWLR command queue as the selected command queue when the lock state command is an oldest entry pending in the first command queue; and
remove the unlock state command from the first command queue, remove the lock state command from the at least one IWLR command queue and determine the at least one IWLR command queue as the selected command queue when the unlock state command is an oldest entry pending in the first command queue.

15. The memory controller of claim 12, wherein the processing unit is further configured to perform operations of:
issuing the lock state command prior to an IWLR operation command to the at least one command queue; and
issuing an unlock state command following the IWLR operation command to the at least one command queue.

16. The memory controller of claim 15, wherein the arbitration device is further configured to:
determine the first command queue as the selected command queue when the lock state command is an oldest entry pending in the at least one IWLR command queue; and
remove the unlock state command from the at least one IWLR command queue, remove the lock state command from the first command queue and determine the first command queue as the selected command queue when the unlock state command is an oldest entry pending in the at least one IWLR.

17. The memory controller of claim 12, wherein the processing unit is further configured to perform operations of:
issuing a wait lock state command prior to a normal operation command to the first command queue; and
issuing a free lock state command following the normal operation command to the first command queue.

18. The memory controller of claim 17, wherein the arbitration device is further configured to:
when the lock state command is an oldest entry pending in the at least one IWLR command queue, removing the wait lock state command from the first command queue and determining the first command queue as the selected command queue;
when the wait lock state command is an oldest entry pending in the first command queue, determining the at least one IWLR command queue as the selected command queue; and
when the free block state command is an oldest entry pending in the first command queue, removing the lock state command from the at least one IWLR command queue, removing the free lock state command from the first command queue and determining the at least one IWLR command queue as the selected command queue.

19. The memory controller of claim 17, wherein the processing unit is further configured to perform operations of:
issuing at least one IWLR operation command to the first command queue; and
issuing the wait lock state command following the at least one IWLR operation command or issuing the free lock state command prior to the at least one IWLR operation command.

20. The memory controller of claim 11, wherein the flash memory comprises a plurality of flash memory dies, wherein each of the flash memory dies comprises a plurality of plane groups, each of the plane groups comprises a plurality of planes, and each of the IWLR operation command is utilized to perform a read operation on a specific one of the plane groups.

21. A storage device, comprising:
a flash memory; and
a memory controller, configured to control operations of the flash memory, comprising:
a storage unit, configured to store information;
a queuing device including a first command queue and at least one independent word line read (IWLR) command queue, wherein the first command queue is utilized for storing a plurality of normal operation commands, and the at least one IWLR command queue is utilized for storing a plurality of IWLR operation commands;
a processing unit, configured to execute program codes and information stored in the flash memory or in the storage unit so as to perform an operation of:
issuing a lock state command between each two consecutive IWLR operation commands to the at least one IWLR command queue; and
an arbitration device, configured to determine a selected command queue from the first command queue and the at least one IWLR command queue according to the lock state command, and deliver an operation command from the selected command queue to the flash memory.

* * * * *